(12) United States Patent
Wu et al.

(10) Patent No.: US 8,649,166 B2
(45) Date of Patent: Feb. 11, 2014

(54) MULTI-POSITIONABLE PORTABLE COMPUTER

(75) Inventors: Chun-Ting Wu, Taipei County (CN); Chen-Pang Chuang, Taipei County (CN)

(73) Assignee: Z124, Georgetown (KY)

( * ) Notice: Subject to any disclaimer, the term of this patent is extended or adjusted under 35 U.S.C. 154(b) by 174 days.

(21) Appl. No.: 13/004,768

(22) Filed: Jan. 11, 2011

(65) Prior Publication Data

US 2012/0176741 A1    Jul. 12, 2012

(51) Int. Cl.
*G06F 1/16* (2006.01)
*H05K 5/00* (2006.01)
*H05K 7/00* (2006.01)

(52) U.S. Cl.
USPC ............. 361/679.27; 361/679.55; 361/679.59

(58) Field of Classification Search
USPC ............... 361/679.06, 679.21–679.3, 679.55, 361/679.59
See application file for complete search history.

(56) References Cited

U.S. PATENT DOCUMENTS

| | | | | |
|---|---|---|---|---|
| 5,247,285 A | * | 9/1993 | Yokota et al. | 361/679.17 |
| 5,375,076 A | | 12/1994 | Goodrich et al. | |
| 5,768,163 A | * | 6/1998 | Smith, II | 708/105 |
| 5,900,848 A | * | 5/1999 | Haneda et al. | 345/1.1 |
| 5,926,364 A | * | 7/1999 | Karidis | 361/679.27 |
| D416,003 S | * | 11/1999 | Schiefer et al. | D14/326 |
| 6,134,103 A | * | 10/2000 | Ghanma | 361/679.05 |
| 6,341,061 B1 | * | 1/2002 | Eisbach et al. | 361/679.46 |
| 6,351,372 B1 | | 2/2002 | Kim | |
| 6,353,529 B1 | * | 3/2002 | Cies | 361/679.05 |
| 6,430,038 B1 | * | 8/2002 | Helot et al. | 361/679.05 |
| 6,437,974 B1 | * | 8/2002 | Liu | 361/679.27 |
| 6,464,195 B1 | * | 10/2002 | Hildebrandt | 248/460 |
| 6,480,374 B1 | * | 11/2002 | Lee | 361/679.17 |
| 6,483,445 B1 | | 11/2002 | England | |
| 6,665,175 B1 | * | 12/2003 | deBoer et al. | 361/679.06 |
| 6,781,823 B1 | | 8/2004 | Nyack | |
| 6,829,140 B2 | * | 12/2004 | Shimano et al. | 361/679.09 |
| 6,845,005 B2 | * | 1/2005 | Shimano et al. | 361/679.06 |
| 6,903,927 B2 | * | 6/2005 | Anlauff | 361/679.28 |
| 6,972,944 B2 | | 12/2005 | Clapper | |
| D519,500 S | | 4/2006 | Maskatia et al. | |
| 7,035,665 B2 | * | 4/2006 | Kido et al. | 455/566 |
| 7,061,472 B1 | * | 6/2006 | Schweizer et al. | 345/168 |
| 7,068,497 B2 | * | 6/2006 | Chu | 361/679.06 |
| 7,072,175 B2 | * | 7/2006 | Ho | 361/679.21 |
| 7,107,084 B2 | * | 9/2006 | Duarte et al. | 455/575.3 |
| 7,158,634 B2 | * | 1/2007 | Eromaki | 379/433.13 |
| 7,180,731 B2 | | 2/2007 | Titzler et al. | |
| 7,215,538 B1 | * | 5/2007 | Chen et al. | 361/679.06 |
| 7,239,505 B2 | * | 7/2007 | Keely et al. | 361/679.09 |
| 7,255,317 B2 | * | 8/2007 | Huang et al. | 248/371 |
| 7,280,348 B2 | | 10/2007 | Ghosh | |
| 7,293,747 B2 | * | 11/2007 | Wang et al. | 248/125.2 |

(Continued)

*Primary Examiner* — Adrian S Wilson
(74) *Attorney, Agent, or Firm* — Haverstock & Owens LLP (57) ABSTRACT

A multi positionable portable computer is able to be set in a variety of form factors. A user display portion comprising a screen is movably coupled to a processing portion having processing circuitry by a hinge having two pivot points. The two pivot points allow for the portable computer to be placed upright for presentations and the like or flat on a surface with the user display angled toward a user for interfacing with the portable computer. A movable optics module is provided that is positionable on a top surface of the display portion whether the display portion is in a landscape position or a portrait position.

17 Claims, 9 Drawing Sheets

(56) References Cited

U.S. PATENT DOCUMENTS

| | | | |
|---|---|---|---|
| D557,695 S | 12/2007 | Cheng et al. | |
| 7,353,053 B2 | 4/2008 | Prichard et al. | |
| D580,429 S | 11/2008 | Cheng et al. | |
| 7,457,108 B2 | 11/2008 | Ghosh | |
| 7,492,891 B2* | 2/2009 | Eldon | 379/433.12 |
| 7,502,222 B2 | 3/2009 | Cheng et al. | |
| D590,388 S | 4/2009 | Price et al. | |
| 7,565,414 B1 | 7/2009 | Love | |
| 7,573,703 B2* | 8/2009 | Chuang et al. | 361/679.27 |
| 7,633,745 B2 | 12/2009 | Sakakibara et al. | |
| 7,652,873 B2* | 1/2010 | Lee | 361/679.06 |
| 7,708,240 B2* | 5/2010 | Homer et al. | 248/130 |
| 7,715,180 B2 | 5/2010 | Titzler et al. | |
| 7,733,331 B2 | 6/2010 | Duarte et al. | |
| 7,836,554 B2 | 11/2010 | Fu | |
| 7,884,815 B2 | 2/2011 | Fraser et al. | |
| 7,898,796 B2 | 3/2011 | Horie | |
| 7,911,783 B2* | 3/2011 | Hsieh et al. | 361/679.55 |
| 7,929,298 B2* | 4/2011 | Hsu | 361/679.59 |
| 7,934,689 B2* | 5/2011 | Chiu et al. | 248/222.11 |
| 8,208,249 B2* | 6/2012 | Chin et al. | 361/679.27 |
| 8,229,522 B2* | 7/2012 | Kim et al. | 455/575.3 |
| D669,467 S | 10/2012 | Ballout | |
| 8,280,464 B2 | 10/2012 | Liu | |
| 8,289,683 B2 | 10/2012 | Wang | |
| 8,306,584 B2 | 11/2012 | Yeh et al. | |
| 8,457,696 B2* | 6/2013 | Pegg | 455/575.3 |
| 2003/0030971 A1 | 2/2003 | Duarte | |
| 2003/0142469 A1* | 7/2003 | Ponx | 361/683 |
| 2004/0057197 A1* | 3/2004 | Hill et al. | 361/683 |
| 2004/0135738 A1* | 7/2004 | Kim et al. | 345/1.1 |
| 2004/0174666 A1 | 9/2004 | Brandenberg et al. | |
| 2004/0228076 A1 | 11/2004 | Clapper | |
| 2004/0233620 A1* | 11/2004 | Doczy et al. | 361/680 |
| 2004/0246665 A1* | 12/2004 | Cheng et al. | 361/683 |
| 2005/0052833 A1* | 3/2005 | Tanaka et al. | 361/681 |
| 2005/0264983 A1* | 12/2005 | Chen | 361/681 |
| 2006/0056143 A1 | 3/2006 | Tatsukami et al. | |
| 2006/0061958 A1* | 3/2006 | Solomon et al. | 361/686 |
| 2006/0126284 A1* | 6/2006 | Moscovitch | 361/681 |
| 2006/0146488 A1* | 7/2006 | Kimmel | 361/681 |
| 2006/0187626 A1* | 8/2006 | Ditzik | 361/681 |
| 2006/0264243 A1* | 11/2006 | Aarras | 455/566 |
| 2007/0076362 A1* | 4/2007 | Lagnado | 361/683 |
| 2007/0182663 A1* | 8/2007 | Biech | 345/1.1 |
| 2007/0217131 A1* | 9/2007 | Kehr | 361/681 |
| 2007/0217135 A1* | 9/2007 | Chuang et al. | 361/681 |
| 2007/0236873 A1* | 10/2007 | Yukawa et al. | 361/681 |
| 2007/0263067 A1 | 11/2007 | Huang et al. | |
| 2008/0007904 A1* | 1/2008 | Chen et al. | 361/681 |
| 2008/0024388 A1* | 1/2008 | Bruce | 345/1.1 |
| 2008/0068786 A1 | 3/2008 | Cheng et al. | |
| 2008/0180892 A1 | 7/2008 | Lai | |
| 2008/0207272 A1 | 8/2008 | Thornton et al. | |
| 2008/0232054 A1* | 9/2008 | Chen et al. | 361/681 |
| 2008/0266767 A1 | 10/2008 | Nicholas et al. | |
| 2009/0095854 A1 | 4/2009 | Forbes et al. | |
| 2009/0170571 A1* | 7/2009 | Alameh et al. | 455/575.3 |
| 2009/0190295 A1* | 7/2009 | Chin et al. | 361/679.27 |
| 2009/0244832 A1* | 10/2009 | Behar et al. | 361/679.55 |
| 2010/0016038 A1* | 1/2010 | Demuynck et al. | 455/575.3 |
| 2010/0053876 A1 | 3/2010 | Widmer et al. | |
| 2010/0053888 A1* | 3/2010 | Nagamura et al. | 361/679.59 |
| 2010/0064536 A1* | 3/2010 | Caskey et al. | 33/303 |
| 2010/0267428 A1 | 10/2010 | Wang et al. | |
| 2011/0061277 A1* | 3/2011 | Demott et al. | 40/606.15 |
| 2011/0161809 A1 | 6/2011 | Gilmour | |
| 2011/0286170 A1* | 11/2011 | Liu | 361/679.4 |
| 2012/0182227 A1 | 7/2012 | Wu | |

\* cited by examiner

MULTI-POSITIONABLE PORTABLE COMPUTER

FIELD OF THE INVENTION

The present invention relates to portable computers. More particularly, the present invention relates to a multi positionable portable computer providing greater ergonomics and convenience.

BACKGROUND

Figure 1A:
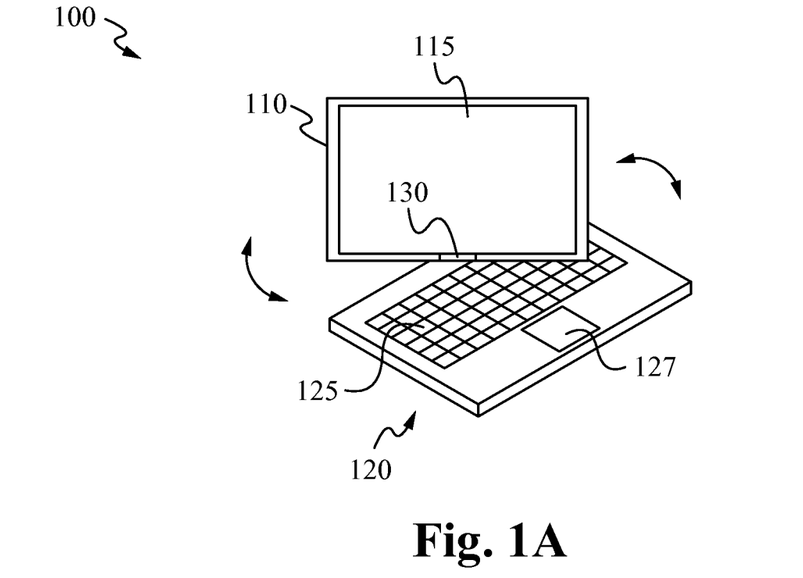
FIG. 1A shows a prior art portable computer.

The portable computer, also referred to as a laptop computer, has become ubiquitous due to its convenience and portability. In general, portable computers offer a high degree of processing capability for creating documents, spreadsheets, and the like. The design of the standard "clamshell" portable computer, along with some variations, is generally useful only for working on one's lap or on a desk. FIG. 1A shows a standard "clamshell" portable computer 100. The clamshell portable computer 100 comprises an display portion 110 having a screen 115. The display portion 110 is rotatably coupled to a processing, or base unit 120. In general, the base unit 120 comprises a keyboard 125 and a trackpad 127. The display portion 110 and the base unit 120 are rotatably coupled by a hinge 130. The hinge 130 has one pivot point. In the example of FIG. 1A, the hinge 130 allows the display portion 110 to open into a usable form factor and close, like a clamshell, into a traveling or portable form factor. The hinge 130 also allows the display portion 110 to swivel with respect to the base unit 120. Some prior art portable computers are configured such that the entire display portion can be rotated 180° and then placed in a closed position so that the portable computer can be used as a tablet. However, these features do not address the desirability of ergonomics and other form factors that may be advantageous for a portable computer that hitherto have not been contemplated. For example, there is no provision to prop the portable computer 100 up on, either in a landscape view or a portrait view.

Figure 1B:
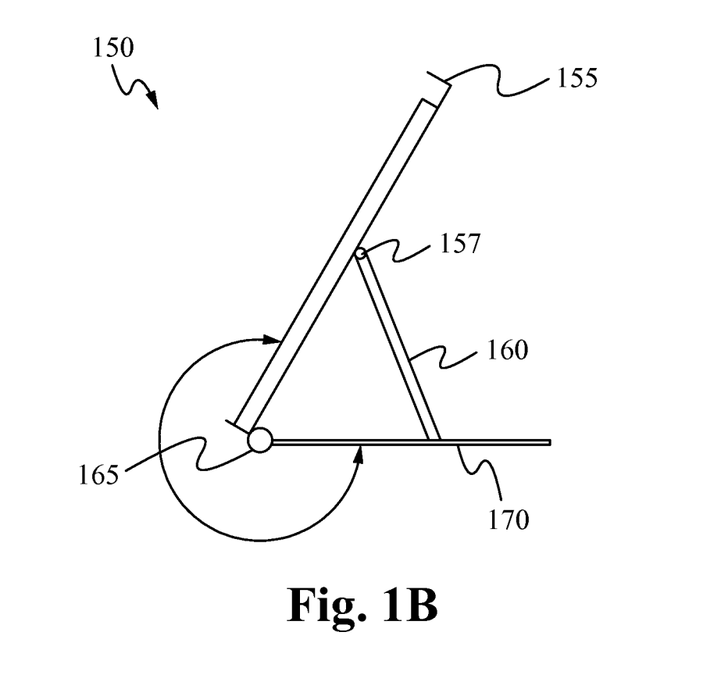
FIG. 1B shows a prior art tablet computer.

FIG. 1B shows a standard tablet computer 150, such as Apple®'s popular iPad®. The tablet computer 150 does not come equipped with any means for supporting the device in an upright position, since most of the time the device is intended to be used in leisure on one's lap, such as when laying down. A cottage industry for making kickstands and cases for tablet computers has developed. For example, a case 155 encases the tablet computer 150. The case comprises a swivel 157 so that a kickstand 160 can be positioned to put the tablet computer 150 at a desired angle. Optionally, a lid 170 is also connected by another swivel 165 so that the lid 170 can function as a base in an open, useful form factor or as a protective cover in a closed, or traveling form factor. Although such additional components can be simple, they add bulk and weight to the tablet computer 150. Additional components also add cost to the tablet computer 150. And since they are not integrated devices, i.e. they are not formed integrally with the tablet computer itself, they generally can come loose or fit poorly over time. Furthermore, tablet computers such as the iPad that have only an display unit housing additional processing generally lack features that most laptop users have come to rely on, such as multiple I/O such as USB ports, CD-ROM drives, or other conveniences.

SUMMARY OF THE INVENTION

What is provided is a portable computer that is positionable in a great variety of form factors without the use if additional components such as kickstands or protective cases. The portable computer is able to be positioned in a standard "working" form factor. In such a form factor, an display portion can be angled slightly toward the user and a support member can be positioned to hold the display portion steady. Also, the present invention can be propped up either in a landscape position or a portrait position for making presentations, live video teleconferencing, or the like. For teleconferencing purposes, a movable camera is provided. The camera can be positioned such that it is on the top edge of the display member whether the display member is in a portrait position or a landscape position.

In one aspect of the invention a portable computer comprises a user display member, a support member, and a hinge assembly for movably coupling the display layer to the support member. Preferably, the hinge comprises a first pivot point anchored to the display member, and a second pivot point anchored to the support member. The dual pivot points allow for the portable computer of the instant disclosure to be positioned in a great variety of form factors. In some embodiments, the support member comprises processing circuitry. The support member also comprises input/output ports for interfacing with external optional components, such as speakers, headphones, keyboards, and the like. In some embodiments, the user display member comprises a touch screen for interfacing with the portable computer. The user display member is settable in one of a portrait orientation and a landscape orientation, depending on the desired use of the portable computer. The support member is settable in a support position or a travel position. For the smallest possible form factor while traveling, the support member comprises a recessed area for receiving the hinge assembly in a travel position.

In some embodiments, the portable computer comprises a camera module. Preferably, the camera is mountable to the display member in a landscape orientation or a portrait orientation. Also, the portable computer has a socket for receiving the camera module in a travel position. This socket can be in any convenient location for stowage of the camera module. In some embodiments, a movable projector is provided. The projector is able to be mounted to the top side of the user display portion whether the user display is set in a landscape position or a portrait position. Preferably, the camera module also comprises a projector. Advantageously, the projector can be oriented to project an image in any direction from the user display module. Therefore, during a presentation, the user can sit anywhere relative to the audience and give a presentation, so that the user can face toward the audience simultaneously.

Other features and advantages of the present invention will become apparent after reviewing the detailed description of the embodiments set forth below.

BRIEF DESCRIPTION OF THE DRAWINGS

The accompanying drawings, which are incorporated in and form a part of this specification, illustrate embodiments of the invention and, together with the description, serve to explain the principles of the invention, but not limit the invention to the disclosed examples.

The present invention is described relative to the several views of the drawings. Where appropriate and only where identical elements are disclosed and shown in more than one drawing, the same reference numeral will be used to represent such identical elements.

DETAILED DESCRIPTION OF THE DRAWINGS

Reference will now be made in detail to the embodiments of a multi positionable portable computer, examples of which are illustrated in the accompanying drawings. While the invention will be described in conjunction with the embodiments below, it will be understood that they are not intended to limit the invention to these embodiments and examples. On the contrary, the invention is intended to cover alternatives, modifications and equivalents, which may be included within the spirit and scope of the invention as defined by the appended claims. Furthermore, in the following detailed description of the present invention, numerous specific details are set forth in order to more fully illustrate the drawings. However, it will be apparent to one of ordinary skill in the prior art that the teachings herein may be practiced without these specific details. In other instances, well-known methods and procedures, components and processes haven not been described in detail so as not to unnecessarily obscure aspects of the present invention. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2A:
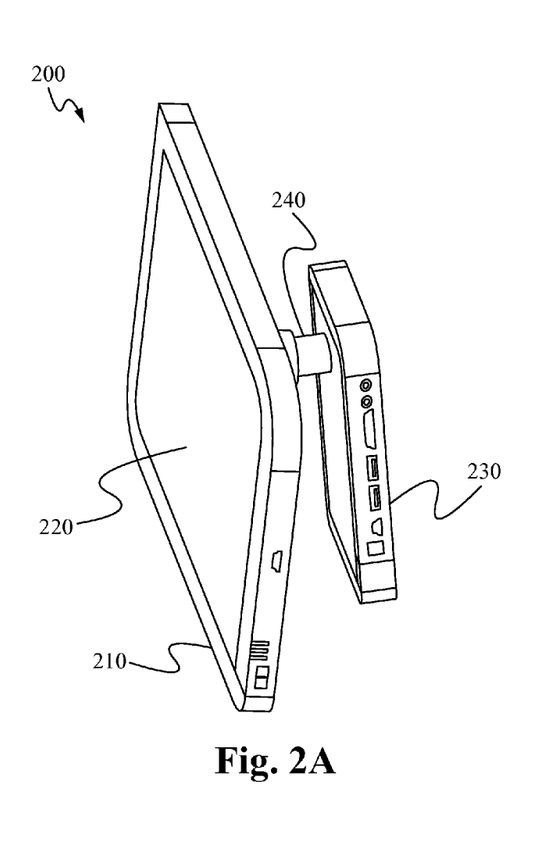
FIG. 2A shows a multi positionable portable computer per an embodiment of this invention.

FIG. 2A shows a multi-positionable portable computer 200. The multi-positionable portable computer 200 comprises an display portion 210. The display portion 210 comprises a screen 220. In some embodiments, the screen 220 is a touch-sensitive screen that functions as an interactive I/O for a user. For example, the screen 220 can be used as a keyboard to enter text or have a pointing device that is manipulated only by touching the screen 220. The display portion 210 is movably coupled to a support member 230. The support member 230 props up the display portion 210 in a great variety of form factors, as will be described in detail below. The display portion 210 is movably coupled to the support member 230 by a hinge assembly 240. The hinge assembly 240, described in detail below, allows for the multi-positionable portable computer 200 to be oriented in a great variety of form factors for performing a wide variety of tasks not previously possible by one computing device.

Figure 2B:
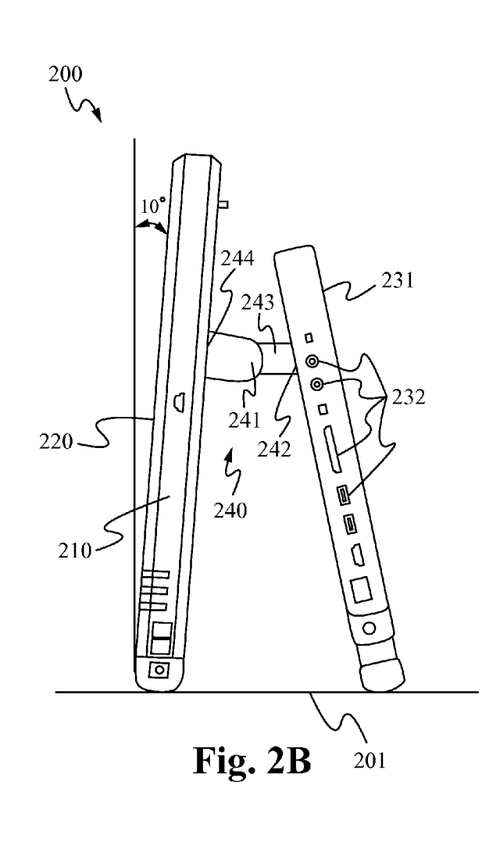
FIG. 2B shows a multi positionable portable computer per an embodiment of this invention in a display position.
Figure 2C:
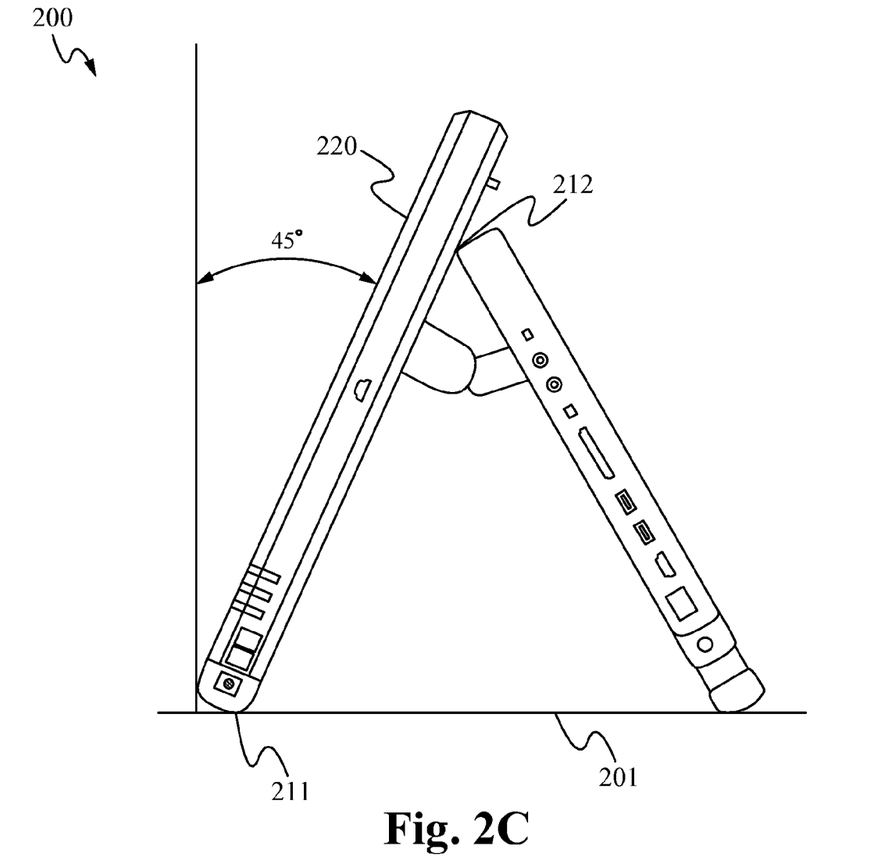
FIG. 2C shows a multi positionable portable computer per an embodiment of this invention in a resting display position.
Figure 2D:
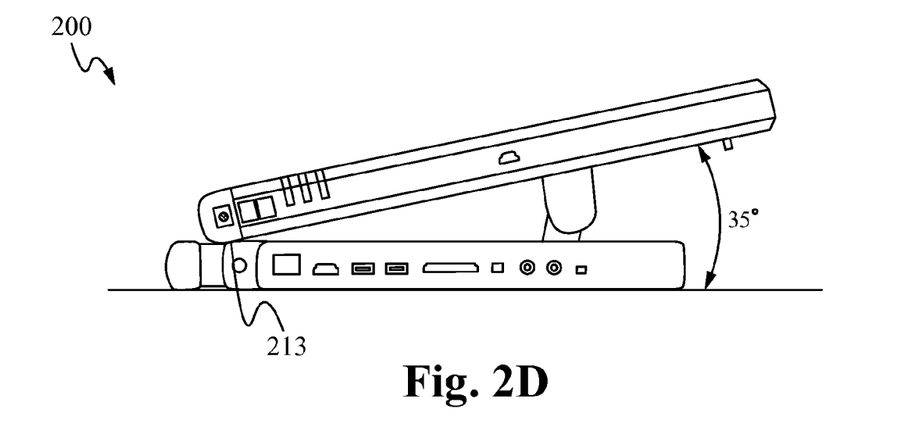
FIG. 2D shows a multi positionable portable computer per an embodiment of this invention in an interface position.

FIGS. 2B-2D show the multi-positionable portable computer 200 in a variety of form factors suitable for several different uses. FIG. 2B shows the multi-positionable portable computer 200 in an upright position with the screen 220 of the display portion 210 at an angle of 10 degrees relative to a plane perpendicular to the ground. In such a form factor, the multi-positionable portable computer 200 can be used, for example, as a teleprompter for a speaker who is sitting at a table. The display portion 210 is propped up by the support member 230. In this embodiment, the support member 231 is also a processing base, or a processing portion comprising processing circuitry (not shown) such as a processor, video and audio circuitry, memory, and the like. The support member 231 also has several I/O 232, such as the typical I/O of a laptop computer: an audio jack, microphone jack, USB ports, LAN port, and the like. The support member 231 is movably coupled to the display portion 210 by the hinge assembly 240. The hinge assembly has a first pivot point 241 anchored to the display portion 210 and a second pivot point 242 anchored to the support member 231. The first pivot point 241 and the second pivot point 242 are movably coupled by a link member 243. The hinge assembly 240 allow for the display portion 210 and the support member 231 to move independently of each other, thereby allowing a great variety of form factors. In some embodiments, the first pivot point 241 is anchored to the display portion 210 by on the pivot point 241. The first pivot point 241 enables the display portion 210 to be rotated with respect to the support member 231, so that the display portion 210 can be set in a landscape form factor or a portrait form factor.

FIG. 2C shows the multi-positionable portable computer 200 in a form factor that is more useful for directly interfacing with the display portion 210. The display portion 210 is set along a plane that is approximately 60 degrees relative to the support surface 201. The display portion 210 has two points of support: a first intersection 211 of the display portion 210 and the support surface 201 on which the multi-positionable portable computer 200 is placed, such as a desk or table, and a second intersection 212 of the display portion 210 and the support member 231. In such a form factor, pressure can be applied to the screen 220 on the display portion 210 without the multi-positionable portable computer 200 moving. The two intersections 211 and 212 provide a normal force against a user's hand touching and otherwise interfacing the screen 220, for example to type on a touchpad or to use a pointing device such as a trackpad. Because of the approximately 45 degree angle of the display portion 210 relative to the ground, the user will be able to display with the multi-positionable portable computer 200 while, for example, standing to make a presentation. Also, the user can have, for example, a desktop computer, reference material, and the like on a desk that the user may have to reference simultaneously while using the multi-positionable portable computer 200. Advantageously, the multi-positionable portable computer 200 consumes less surface area on the support surface 201 in such a form factor as shown in FIG. 2C so that a user can reference and display with multiple items on a desk or workstation.

FIG. 2D shows the multi-positionable portable computer 200 in an interface form factor. In such an orientation, the multi-positionable portable computer 200 is suited for interfacing with the display portion 210 via, for example, a touch-screen keyboard. The display portion 210 is positioned at an angle approximately 35 degrees from the support surface 201. The display portion is held at that angle by a first intersection 213 and the hinge assembly 240. A user can manipulate the screen 220 of the display portion 210 without disturbing the form factor. It is important to note that the above exemplary form factors, and many others not mentioned herein for the sake of clarity and brevity, are achieved in a monolithic device not requiring extra parts such as props, kickstands, or the like. In the embodiments shown above, the support member 230 is a processing unit. However, the person of ordinary skill having the benefit of this disclosure will readily appreciate that several variations can be made within the scope and spirit of the disclosure. For example, all processing circuitry and I/O can be within the display portion 210, and the support member 230 can have other accessories, such as stereo speakers, a spare battery pack, or any other convenient accessory for a computing device.

Figure 3A:
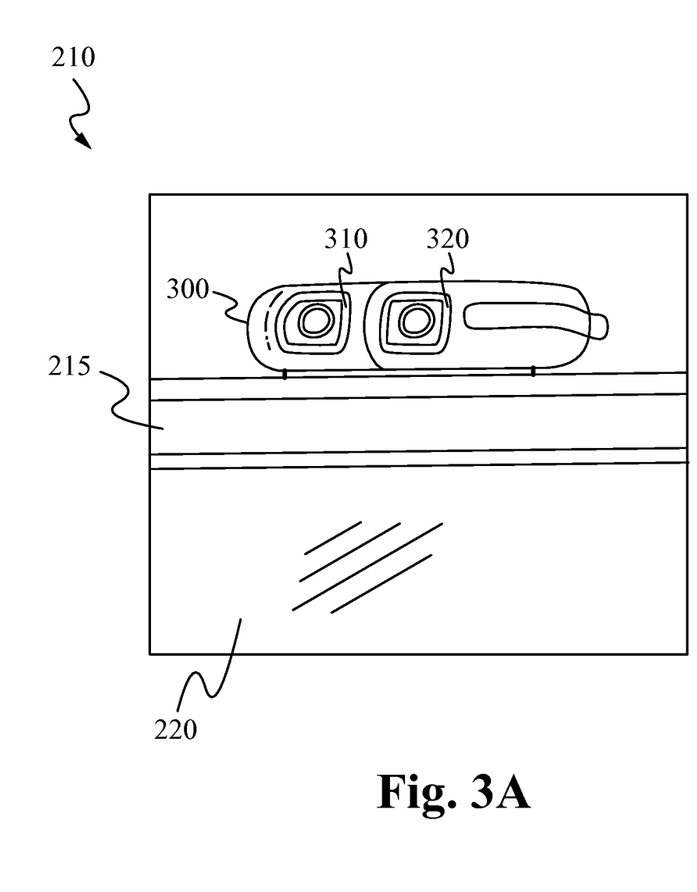
FIG. 3A shows a positionable optical module per an embodiment of this invention.
Figure 3B:
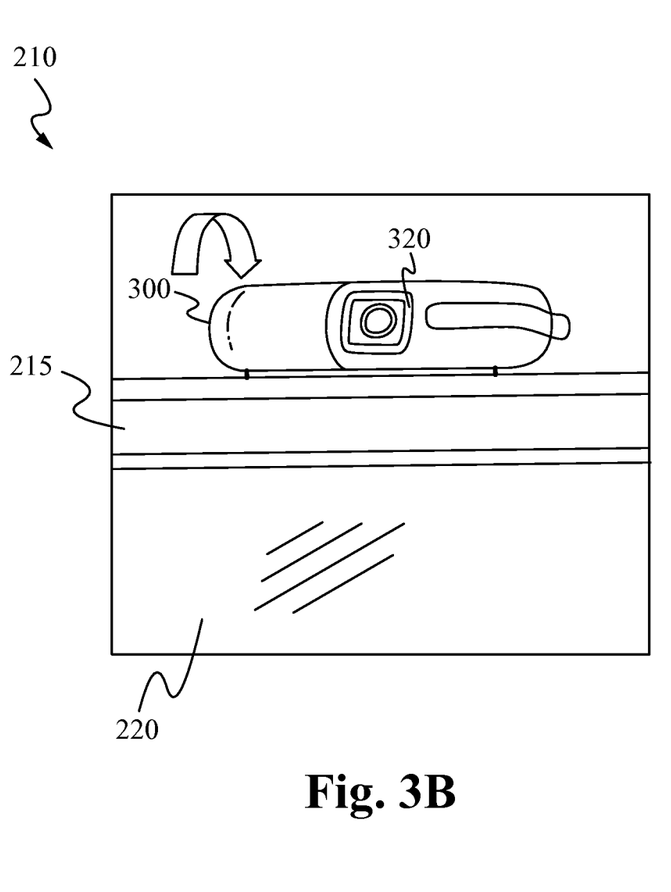
FIG. 3B shows a positionable optical module per an embodiment of this invention rotated to face away from a user.

FIGS. 3A-3E show the multi-positionable portable computer having additional features. In some embodiments, the multi-positionable portable computer further comprises an optics module 300. Preferably, the optics module 300 comprises a camera 310 and a projector 320. Alternatively a monolithic optical assembly capable of operating as both a camera and a projector is contemplated. The optics module 300 is mounted to a top surface 215 of the display portion 210. The mounting location facilitates web based meetings, self portraits, and the like. Preferably, the camera 310 or projector 320 are rotatably mounted to the optics module 300. Advantageously, the optics module 300 can be oriented toward a user facing the screen 220 of the display module 210 or away from the user, as shown in FIG. 3B. A user (not shown) is able to use the same device to access data, such as a presentation, and project the data without the use of a costly, external projector. In general, coupling a personal computer to a projector can be complicated and frustrating. The embodiments of the multi-positionable portable computer 200 disclosed herein allow for more easily facilitated and productive presentations.

Figure 3C:
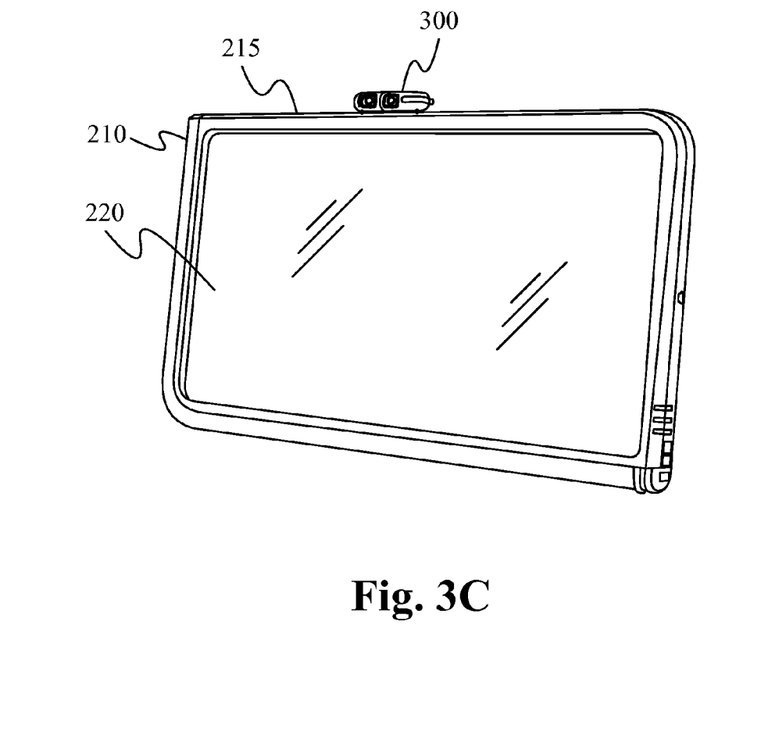
FIGS. 3C and 3D show the multi positionable portable computer in a landscape and portrait position respectively.
Figure 3D:
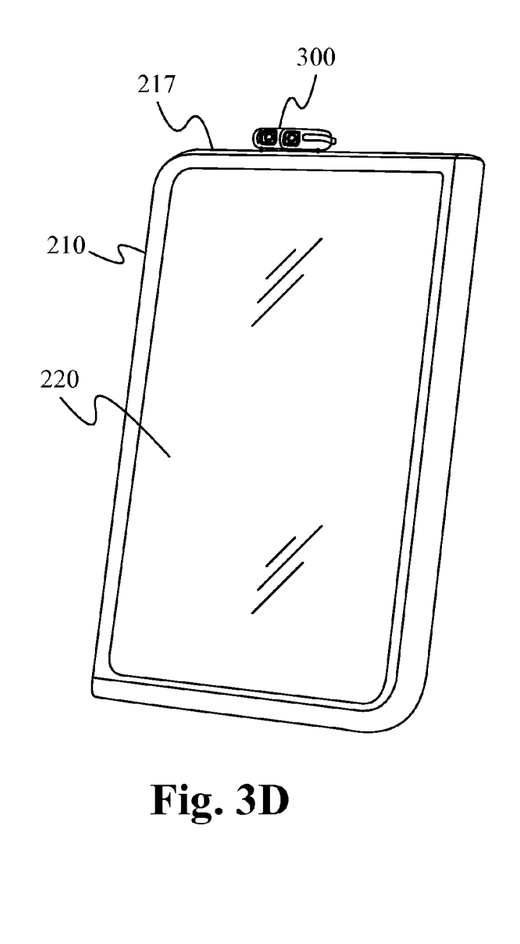

FIGS. 3C and 3D show the optics module 300 on the top surfaces 215 or 217 whether the display portion 210 is oriented in a landscape or portrait orientation respectively. Preferably, the optics module 300 is detachably mountable to either surface. As discussed above, a first pivot point 241 (FIG. 2B) is provided to allow the display portion 210 to be oriented in a landscape or portrait orientation without disturbing an orientation of the support member 230 (FIG. 2A).

Figure 3E:
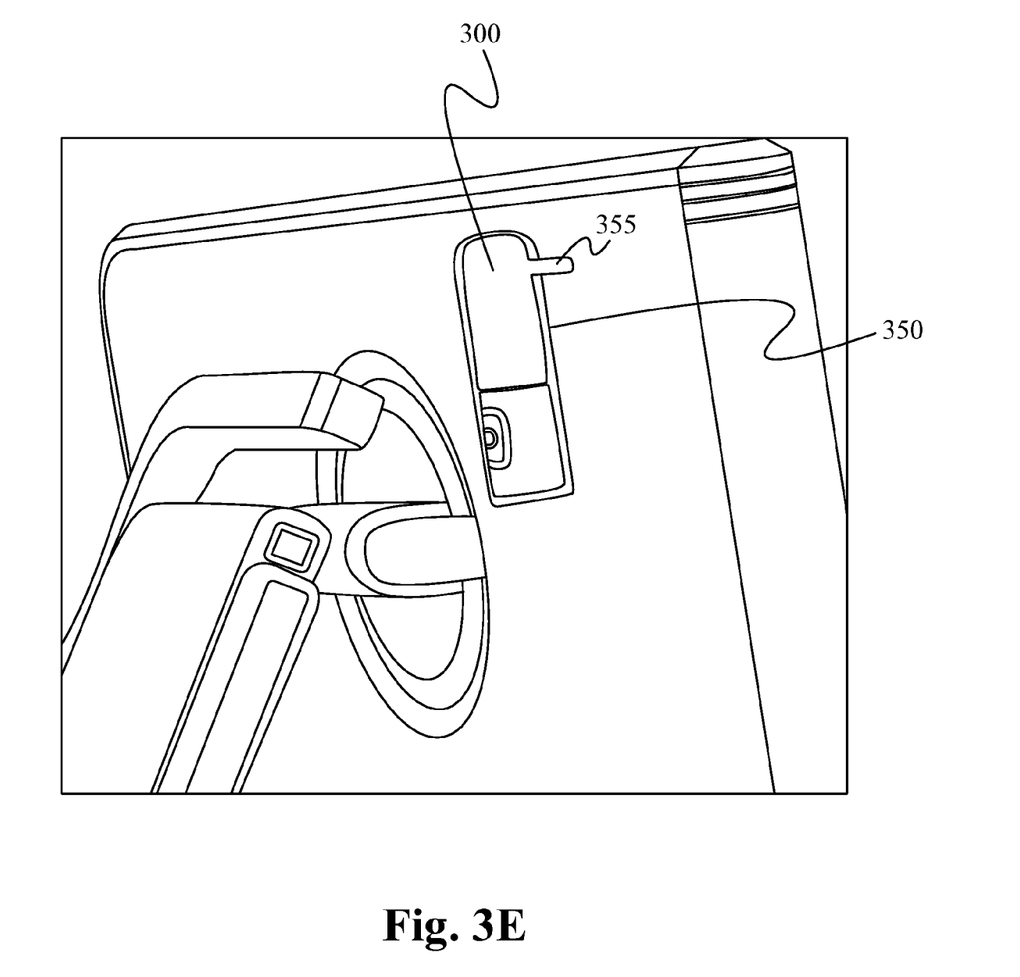
FIG. 3E shows the optical module stowed for portability.

FIG. 3E shows the optics module 300 docked in a storage receptacle 350. Preferably, the stowage receptacle 350 comprises a latch 355 for mating with a groove 357 within the optical module 300. The mating of the latch 355 and groove 357 function to secure the optical module in the receptacle 350.

Figure 4A:
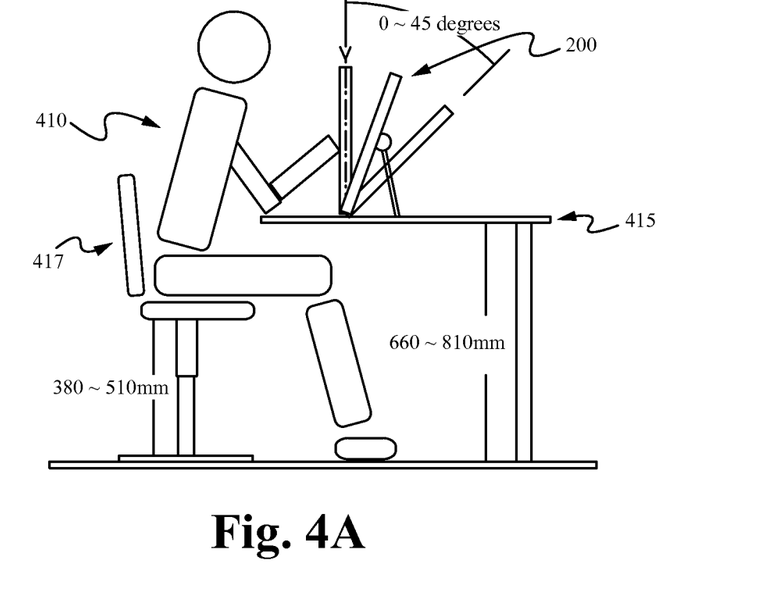
FIGS. 4A and 4B show exemplary ergonomic benefits of a multi positionable portable computer.
Figure 4B:
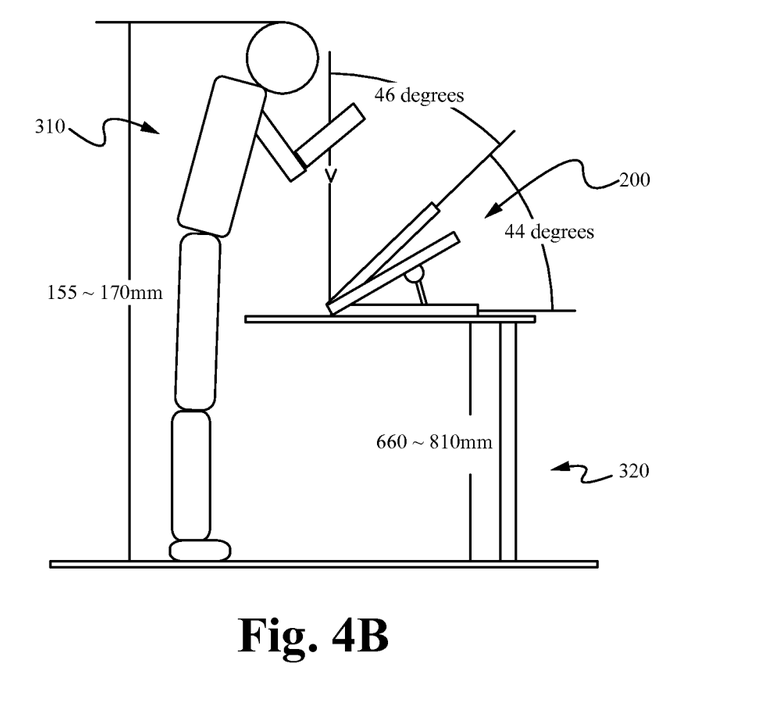

FIGS. 4A and 4B show the ergonomic benefits of the multi-positionable portable computer 200. FIG. 4A shows a user 410 sitting at a desk 415. Most office desks have a height of 660-810 mm and are adjustable in that general range to conform to people of different heights, and generally an office chair 417 is also adjustable. In a sitting position, the user is able to adjust the multi-positionable portable computer 200 to a position recommended for optimum ergonomics. Similarly, FIG. 4B shows a user 430 using the multi-positionable portable computer 200 in a standing position. For example, the user 430 may be at a lectern 320 or a desk addressing an audience. Advantageously, the multi-positionable portable computer 200 is able to be set such that the display portion 210 is facing the user 430 so that the user 430 may reference notes with minimal breaking of eye contact from the audience. It is important to note that the multi-positionable portable computer 200 can be brought by the same user 410 or 430 from a sitting position as in FIG. 4A to a standing position as in FIG. 4B and positioned without the use of an additional and external prop member, support member, kickstand, or the like. As a result, the user 410 or 430 is able to quickly go from a sitting position in an office to a lectern in an auditorium without being encumbered by multiple items to carry.

Figure 5A:
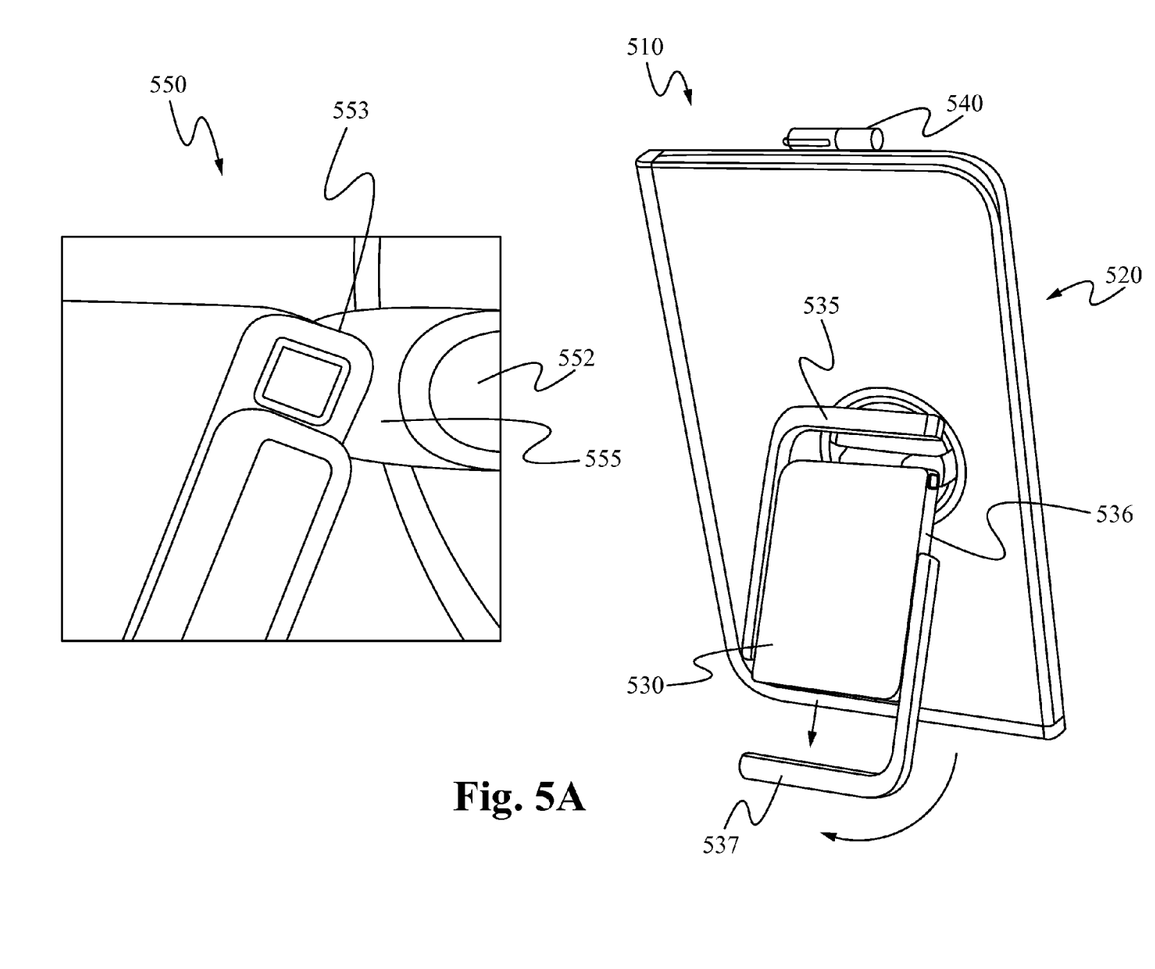
FIG. 5A shows sliding prop and handle portions of a multi positionable portable computer.
Figure 5B:
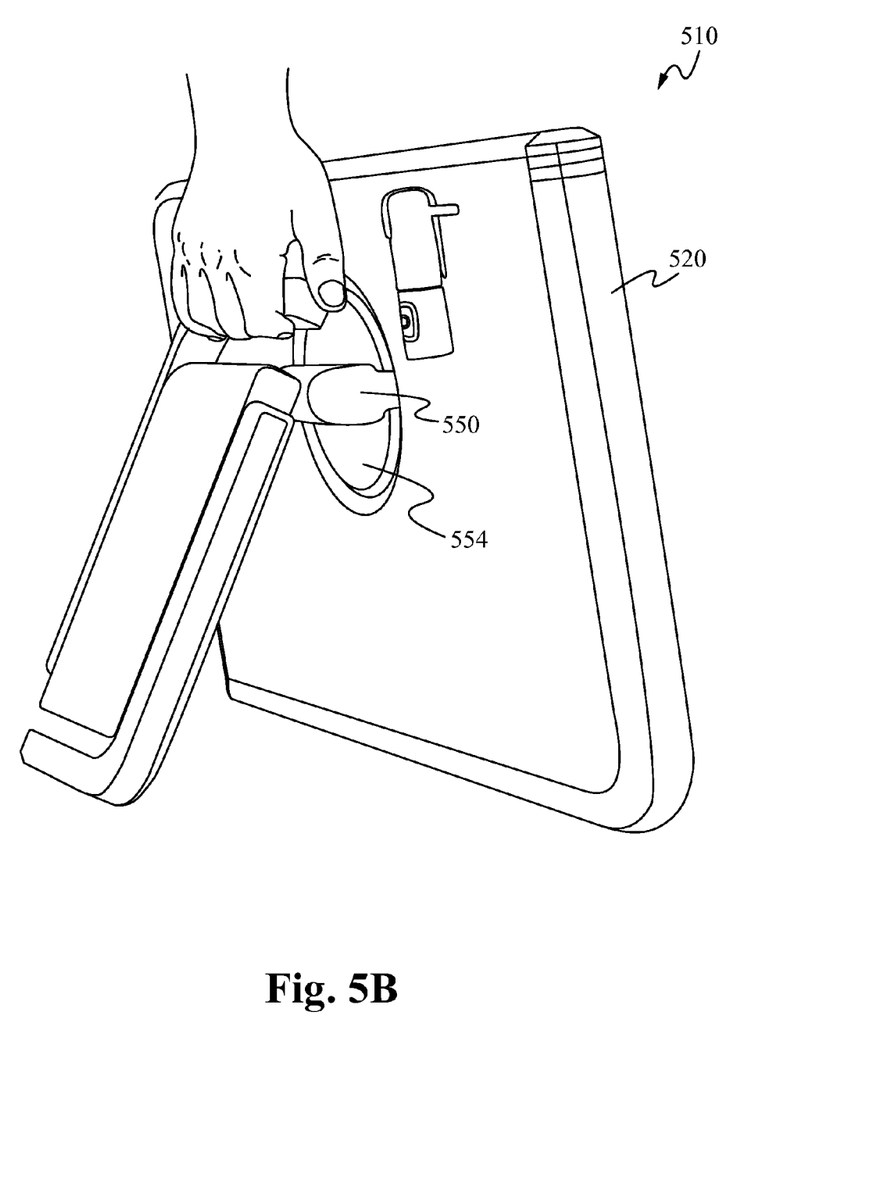
FIG. 5B shows a handle portion of a multi positionable portable computer.

FIGS. 5A and 5B show an alternative embodiment of a multi-positionable portable computer 510. The multi-positionable portable computer 510 comprises an display member 520 hingedly coupled to a support member 530. In the example of FIG. 5A, the multi-positionable portable computer 510 is positioned in an upright, portrait position. The multi-positionable portable computer 510 further comprises an optical module 540. As described above, the optical module 540 operates as a camera for facilitating video conferencing and/or a projector for making presentations. The support member 530 is hingedly coupled to the display member 520 by a double hinge mechanism 550 shown in the magnified view of FIG. 5A. The double hinge mechanism 550 comprises a first pivot point 552 mounted to the display portion 520. The first pivot point 552 enables both angular motion of a link member 555 relative to a plane defined by the back surface of the display module 520 along with rotational motion with respect to an axis at the first pivot point perpendicular to a plane defined by the back surface of the display module 520. The link member 555 couples the first pivot point 552 to a second pivot point 553 mounted to the support member 530. The second pivot point 553 enables an angular motion of the link member 555 with respect to a plane defined by the surface of the support member 530. In some embodiments, the second pivot point 553, rather than the first pivot point 552, enables a rotational motion with respect to an axis at the second pivot point 553 perpendicular to a plane defined by the surface of the support member 530 for setting the multi-positionable portable computer 510 in one of a landscape position or a portrait position.

The support member 530 further comprises a first extending member 537 slidably mounted to the support member 530. The first extending member 537 can be extended and retracted in order to enable a wide range of angles for propping or supporting the display member 520 and to effectuate several positions, such as described in FIGS. 4A and 4B. The support member 530 further comprises a second extending member 535, also slidably mounted to the support member 530. The second extending member enables the support member 530 to act as a prop or a kickstand for the display member 520 at any angle relative to a surface on which the multi-positionable portable computer 510 is placed. By extending and retracting the first support member 537 and second support member 535, a user is able to quickly and easily set the multi-positionable portable computer 510 to any desired angle without the use of external or aftermarket cases, props, kickstands, or the like. As a result, the user is able to use the multi-positionable portable computer 510 for a great variety of functions such as personal computing, as a prompter at a lectern, as a projector or as a video conferencing device without being encumbered by multiple items that must be accounted for. In some embodiments, the first pivot point 552 and the second pivot point 553 are implemented with a degree of friction sufficient to support the weight of the multi positionable portable computer 510 such that the user can adjust the display module 520 and support portion 530 as desired. A sufficient degree of friction in the pivot points 552 and 553 should be chosen such that a human user can easily overcome the friction, but sufficient to support the multi positionable portable computer 510 in any position. Alternative mechanisms and means for adjusting and locking in place the display module 520 and support member 553 will be apparent to the person of ordinary skill having the benefit of this disclosure.

FIG. 5B shows the multi-positionable portable computer 510 with the second extending support member 535 extended and being used as a carrying handle for simplicity of transport. Furthermore, the display member 520 comprises a recessed portion 554. The recessed portion 554 is of a sufficient size and form factor to receive the entirety of the hinge mechanism 550 so that the multi-positionable portable computer 510 can be set in a compact form factor having minimal features for stowage, travel, and the like.

The present invention has been described in terms of specific embodiments incorporating details to facilitate the understanding of the principles of construction and operation of the invention. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Angles, positions, and uses of the multi positionable portable computer shown in the several drawings are merely exemplary and are not intended to be in any way limiting.

What is claimed is:

1. A portable computer comprising:
    a. a user display member having a top portion and a bottom portion;
    b. a support member having a recessed area, a top portion and a bottom portion; and
    c. a hinge assembly for coupling the user display member to the support member, the hinge comprising:
        i. a first pivot point having a first end anchored to the user display member and a second end protruding at a distance away from the user display member;
        ii. a second pivot point having a first end anchored to the support member and a second end protruding at a distance away from the support member; and
        iii. a link member movably coupling the second ends of the first pivot point and the second pivot point, such that the portable computer can be in a form ranging from the top portion of the user display member and the top portion of the support member being closer together than the bottom portion of the user display member and the bottom portion of the support member, to the bottom portion of the user display member and the bottom portion of the support member being closer together than the top portion of the user display member and the top portion of the support member,
    wherein the recessed area of the support member is configured to receive the hinge assembly in a travel position.

2. The portable computer of claim 1 wherein the support member comprises processing circuitry.

3. The portable computer of claim 1 wherein the support member comprises input/output ports.

4. The portable computer of claim 1 wherein the support member comprises a disc drive.

5. The portable computer of claim 1 wherein the user display member comprises a keyboard.

6. The portable computer of claim 1 wherein the user display member comprises a touch screen.

7. The portable computer of claim 1 wherein the user display member is settable in one of a portrait orientation and a landscape orientation.

8. The portable computer of claim 1 wherein the support member is settable in a support position or a travel position.

9. The portable computer of claim 1 further comprising a camera module, wherein the camera is mountable to the user display member in a landscape orientation or a portrait orientation.

10. The portable computer of claim 9 further comprising a receptacle for receiving the camera module in a travel position.

11. The portable computer of claim 1 wherein the support member comprises at least one extending prop member slidably coupled to the support member for providing additional length to the support member.

12. The portable computer of claim 1 wherein the support member comprises at least one extending handle member slidably coupled to the support member.

13. A multi positionable portable computer comprising:
    a. a user display portion;
    b. a processing portion;
    c. a hinge assembly for movably coupling the user display portion to the processing portion, the hinge assembly having:
        i. a first pivot point anchored to the user display portion;
        ii. a second pivot point anchored to the processing portion;
        iii. a link member connecting the first pivot point to the second pivot point;
    d. a recessed area in one of the user display portion and the processing portion for receiving the link member in a traveling form factor;
    e. an optics module, wherein the optics module is detachable and positionable such that it can be mounted to a top side of the user display module, the optics module comprising:
        i. a projector for projecting images onto a screen; and
        ii. a camera;
    f. an extendable prop member slidably coupled to the processing portion for providing additional length to the processing portion; and
    g. an extendable handle member slidably coupled to the processing portion for enhanced portability, wherein the extendable prop member and the extendable handle member are slidably coupled to the processing portion at opposite sides of the processing portion.

14. The multi positionable portable computer of claim 13 wherein the first pivot point enables an angular motion of the link member relative to a plane defined by a surface of the display portion, and a rotational motion with respect to an axis at the first pivot point perpendicular to the plane defined by the back surface of the display portion.

15. The multi positionable portable computer of claim 13 wherein the second pivot point enables an angular motion of the link member with respect to a plane defined by a surface of the support member, and a rotational motion with respect to an axis at the second pivot point perpendicular to the plane defined by the surface of the support member.

16. The multi positionable portable member of claim 13 wherein at least one of the extendable prop member and the extendable handle member is adjusted by extending or retracting to set the portable computer at a desired angle.

17. The multi positionable portable computer of claim 13 wherein extension direction of the extendable prop member is opposite of extension direction of the extendable handle member.

* * * * *